(12) United States Patent
Schmicker et al.

(10) Patent No.: US 10,272,520 B2
(45) Date of Patent: Apr. 30, 2019

(54) JOINT-SITE STRUCTURE FOR COMPONENTS TO BE CONNECTED BY MEANS OF OVERLAP FRICTION WELDING, AND METHOD FOR CONNECTING COMPONENTS BY MEANS OF FRICTION WELDING

(71) Applicant: IFA-Technologies GmbH, Haldensleben (DE)

(72) Inventors: David Schmicker, Magdeburg (DE); Marcus Kreibich, Magdeburg (DE); Frank Trommer, Magdeburg (DE); Andreas Krueger, Schoenebeck/Elbe (DE)

(73) Assignee: IFA-Technologies GmbH, Haldensleben (DE)

( * ) Notice: Subject to any disclaimer, the term of this patent is extended or adjusted under 35 U.S.C. 154(b) by 118 days.

(21) Appl. No.: 15/587,530

(22) Filed: May 5, 2017

(65) Prior Publication Data
US 2017/0320160 A1    Nov. 9, 2017

(30) Foreign Application Priority Data

May 6, 2016    (DE) .................. 10 2016 005 464

(51) Int. Cl.
*B23K 20/12*   (2006.01)
*B23K 33/00*   (2006.01)
(Continued)

(52) U.S. Cl.
CPC ............ *B23K 20/129* (2013.01); *B23K 20/12* (2013.01); *B23K 33/006* (2013.01); *B23K 2101/06* (2018.08); *B23K 2101/10* (2018.08)

(58) Field of Classification Search
None
See application file for complete search history.

(56) References Cited

U.S. PATENT DOCUMENTS

| 4,331,280 A | * 5/1982 | Terabayashi ........... B23K 20/12 |
| | | 228/114.5 |
| 6,660,407 B1 | 12/2003 | Bender et al. |
| (Continued) | | |

FOREIGN PATENT DOCUMENTS

| DE | 36 26 009 A1 | 2/1987 |
| DE | 40 22 303 A1 | 1/1992 |
| (Continued) | | |

*Primary Examiner* — Devang R Patel
(74) *Attorney, Agent, or Firm* — Collard & Roe, P.C.

(57) ABSTRACT

A joint-site structure for components to be connected by overlap friction welding. At least one step of at least one component, on which an axially set-back ring-shaped joining surface is situated, is provided with a radial undercut, in such a manner that on the face side, a region of this step that is unchanged in diameter forms a radial support ridge, which is connected with the at least one component by way of a heat throttle that is reduced in cross-section. The length of each step is designed in such a manner that when the face surface of the one component makes contact with the ring-shaped joining surface of the other component, the other face surfaces of these components, which surfaces lie opposite one another in the same radial position, are still exposed until completion of the friction-welding process.

11 Claims, 5 Drawing Sheets

(51) Int. Cl.
*B23K 101/06* (2006.01)
*B23K 101/10* (2006.01)

(56) References Cited

U.S. PATENT DOCUMENTS

| | | | |
|---|---|---|---|
| 2007/0284407 A1 | 12/2007 | Jutz et al. | |
| 2009/0324986 A1* | 12/2009 | Kleber | B23K 20/12 |
| | | | 428/591 |
| 2014/0016994 A1* | 1/2014 | Gani | B23K 20/129 |
| | | | 403/270 |
| 2016/0039042 A1* | 2/2016 | Riggs | B23K 20/129 |
| | | | 405/170 |

FOREIGN PATENT DOCUMENTS

| | | |
|---|---|---|
| DE | 40 22 447 A1 | 1/1992 |
| DE | 199 34 855 C1 | 11/2000 |
| DE | 103 36 668 A1 | 2/2005 |
| DE | 10 2004 019 012 A1 | 11/2005 |
| DE | 10 2008 007 541 A1 | 8/2009 |
| DE | 10 2008 064 267 A1 | 8/2009 |
| DE | 10 2010 049 872 A1 | 5/2012 |
| JP | 57-190793 A | 11/1982 |
| JP | 59-007490 A | 1/1984 |
| JP | H01-138080 A | 5/1989 |
| JP | H05-305462 A | 11/1993 |
| JP | 2004-138209 A | 5/2004 |
| WO | 2012/059079 A2 | 5/2012 |

\* cited by examiner

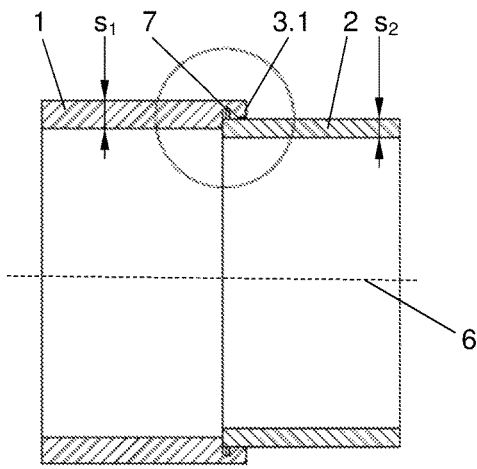
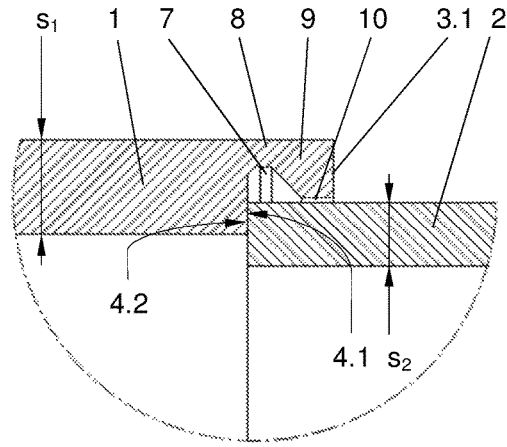
Fig. 3a  Fig. 3b
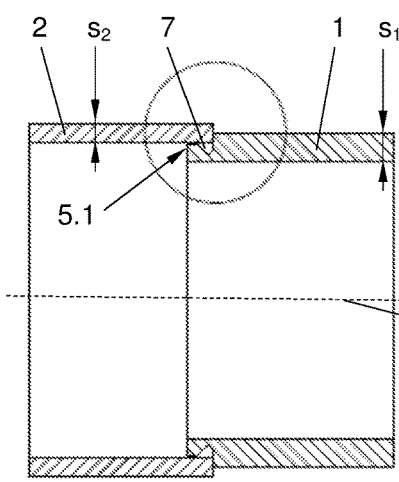
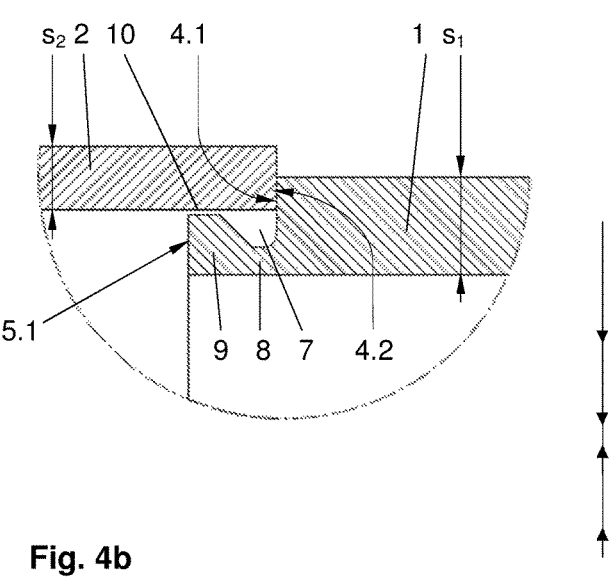
Fig. 4a  Fig. 4b

JOINT-SITE STRUCTURE FOR COMPONENTS TO BE CONNECTED BY MEANS OF OVERLAP FRICTION WELDING, AND METHOD FOR CONNECTING COMPONENTS BY MEANS OF FRICTION WELDING

CROSS REFERENCE TO RELATED APPLICATIONS

Applicant claims priority under 35 U.S.C. § 119 of German Application No. 10 2016 005 464.6 filed May 6, 2016, the disclosure of which is incorporated by reference.

BACKGROUND OF THE INVENTION

1. Field of the Invention

The invention proceeds from a joint-site structure for components, for example hollow shafts, which are connected with one another by means of what is called overlap friction welding, and to a method for connecting components by means of overlap friction welding.

2. Description of the Related Art

In overlap friction welding, the joining regions of the components to be connected with one another are structured in such a manner that after friction welding has taken place, they overlap coaxially, at least in part. As a result, at least one of the components must have at least one radial step with which it accommodates the other component, in each instance. In this regard, the step can be formed, in terms of the outside diameter, by reducing the outside diameter, and, in terms of the inside diameter, by increasing the inside diameter, proceeding from the face surface of the component, in each instance, over a specific axial length of the component. In both embodiments, free spaces for accommodating the plasticized and/or liquid welded material that is formed during friction welding are generally provided. Not only regions of the face surfaces of the components but also parts of the regions of the components that overlap coaxially can serve as joining surfaces.

In the simplest case, a free space is worked into the face surface of one of the components, as an inner step, which space accommodates a cylindrical component having a complementary outside diameter. To create what is called a weld bead chamber, to accommodate the weld bead material that occurs during friction welding, the cylindrical component can have a chamfer, a small outer step or a ring groove in its face surface. The face surfaces of the two components that lie opposite one another serve as joining surfaces (DE 40 22 303 A1).

In another joint-site structure for friction welding a hub/shaft composite workpiece, shaft and hub have at least one outer and one inner step, having a slight radial overlap, from which a conical binding zone is formed during friction welding. The diameters of shaft and hub are designed, on both sides of the step or steps, in such a manner that ring-shaped cavities are present between shaft and hub, into which cavities the paste-like material of the friction-welding process can spread out, and thereby a widened binding zone is formed (DE 103 36 668 A1).

These two joint-site structures are directed at connecting comparatively compact parts. Connecting components having greater construction lengths, for example axially stringing together sections of hollow shafts, cannot be implemented using the joint-site structures described above.

For friction welding of consecutive sections of hollow shafts, it is known to configure the ends of the shaft sections, which ends are to be welded together, in stair-like form. In this way, the friction-welded region is configured as an axial insertion region, in which the ends of the shaft sections that are friction-welded to one another engage into one another coaxially. The steps of the two insertion regions are shaped to be conical. The press-down force during friction welding acts on them. When multiple conical steps are provided, multiple ring-shaped weld seams form. The stair-like joint-site structure also serves to maintain coaxial centering of the shaft sections during friction welding (DE 10 2008 064 267 A1).

The disadvantage of this joint-site structure consists in that only relatively thick-walled hollow shafts can be welded to one another using this structure, or hollow-shaft parts can be welded to bevel gears or gear wheels using this structure. For components having thinner walls, the support effect of the radial process forces resulting from the welded parts themselves is not sufficient, however, and this insufficiency restricts the use of this joint-site structure. It is furthermore disadvantageous that the diameters of the stair-shaped steps must be precisely coordinated with one another in order to accommodate the plasticized friction-welding material. If excessive friction-welding material occurs, it can not only exit toward the outside but also enter into the interior of the hollow shaft, and this result in turn requires subsequent machining.

For friction welding of pistons for internal combustion engines, the upper parts are connected with the lower parts of the pistons by means of friction welding. For this method, two joint-site structures are known. For one thing, the upper part and the lower part are prepared in such a manner that the two parts are conically inserted into one another and thereby centering takes place for friction welding. The weld bead that occurs during the friction-welding process is pressed into an adjacent gap, which takes up the entire volume of the weld material. For another thing, the components are welded to one another with an I-butt joint. For this purpose, the components have multiple steps. One of the components has an additional step, thereby causing a ring-shaped cavity to form, which serves to accommodate the weld bead (DE 10 2004 019 012 A1).

These two variants have the disadvantage that a weld bead always forms on at least one outer or inner side. Although the weld bead is not disruptive when using pistons, it does lead to subsequent machining in the case of thin-walled pipes.

Furthermore, a method for the production of piston/cylinder arrangements is known, wherein the cylinder cover as well as the cylinder bottom are connected with the cylinder by means of friction welding, in unreleasable, material-fit manner. The outside diameter of cylinder head and cylinder bottom correspond to the outside diameter of the cylinder. A step is worked in on the side with which they are welded to the cylinder, so that the cylinder head and bottom can be set onto the cylinder. In addition, a circumferential joint is worked into the step, which joint accommodates the weld bead that occurs as the result of friction welding (DE 40 22 447 A1).

This method has the disadvantage that the weld bead exits to the outside on one side, thereby making subsequent machining necessary. This method also is unsuitable for thin-walled hollow shafts, due to the seam preparation. The butt joint used is a corner butt joint, but an I-butt joint is required for thin-walled hollow shafts.

Another joining structure for connecting a bearing part with a sleeve also provides for a reduction in the outside diameter of the bearing part. Additionally, a circumferential groove is also worked into the transition from the reduced, smaller diameter to the larger nominal diameter of the bearing part. The seam preparation on the sleeve provides for a coaxial bore on the sleeve bottom, which bore corresponds to the diameter of the smaller outside diameter of the pipe. For the friction-welding process, the bearing part is inserted into the bore of the sleeve with the reduced outside diameter (JP 59007490 A).

The disadvantage of this joining structure consists in that when welding two thin-walled pipes, these would have to have different outside diameters, which would always cause an outer step to occur. Furthermore, a step that projects radially inward is required in the pipe having the larger outside diameter, to produce a face-side joining surface. This step brings flow-technology disadvantages with it when fluids flow through the pipes.

Finally, a method for the production of a friction-welded shaft/disk composite piece is known, with which method thin-walled hollow shafts can also be welded. For this purpose, the outside diameter of the shaft and the inside diameter of the disk have at least a complementary gradation, wherein the inside diameter is slightly smaller, in each instance, than the outside diameter that lies opposite it in the assembly position. The friction-weld connection forms in these regions of what is called weld overlap, wherein the shaft, by its nature, has a lower wall thickness in its region that has the smaller outside diameter. For this reason, this region is provided with a support element on the inside, which element is enclosed during friction welding by means of plastic deformation of the ring-shaped bead that forms on this thin-walled hollow shaft. After the shaft/disk composite piece cools down and solidifies, a firm seat of the support element in the interior of the hollow shaft is achieved (DE 199 34 855 C1). The disadvantage of this method consists in the additional effort required by production and positioning of the support element.

SUMMARY OF THE INVENTION

The joint-site structure according to the invention for components to be connected by means of friction welding has the significant advantage, as compared with the aforementioned state of the art, that even thin hollow shafts can be connected with one another, without additional support elements, in precisely coaxial manner and without subsequent machining, at high quality, by means of overlap friction welding. For this purpose, the gradation of the joint sites is structured in such a manner that support of the radial process forces in the coaxial insertion region of the components is guaranteed. Furthermore, contaminants and chips resulting from the welding process are intercepted both toward the inside and toward the outside by means of the joint-site structure according to the invention. In contrast, process gases that occur due to heating can exit toward the outside without hindrance.

These advantages are achieved in that the ends of the components that are to be welded to one another have a coaxial insertion region, in each instance, and these insertion regions engage into one another coaxially during friction welding, in such a manner that a radial gap is situated between the mantle surfaces of the insertion regions that engage into one another. Such an insertion region is formed by at least one step situated on at least one of the components, having a smaller diameter as compared with its outside diameter. Via this step, a ring-shaped face surface that is axially set back with reference to the face surface of this component is formed, which surface is configured as a joining surface for friction welding. Instead of the term "step," the term "stair step" is also common.

According to the invention, the at least one step of the at least one component on which the axially set-back ring-shaped joining surface is situated is provided with a radial undercut in its throat region, which undercut offers an accommodation volume for friction-weld material. Due to this undercut, the ring-shaped wall of the component experiences weakening of its cross-section. This reduced cross-sectional region acts as a heat throttle for the heat that spreads out from the friction-welding region up to the region that follows the undercut, which region increases again in cross-section, i.e. is not changed by means of the undercut. This region, which has the original cross-section, forms a radial support ridge that guarantees support of the radial process forces, in connection with the mantle surface of the other component that lies coaxially opposite to it.

If the two components to be welded to one another have the same number of steps or the same number of stair steps of a step, then the length of each step of their steps or stair steps is designed so that when the one face surface of the one component makes contact with the axially set-back ring-shaped joining surface of the other component, the other face surfaces of these components, which surfaces lie opposite one another in the same radial position, are still exposed until completion of the friction-welding process, i.e. they therefore do not touch as long as the axial process force of the friction-welding process is still in effect. In this way, it is guaranteed that the axial process force is transferred solely by way of the ring-shaped joining surface or ring-shaped joining surfaces during the entire friction-welding process, thereby achieving reliable formation of the friction-weld connection. In other words: The design of the length or of the axial gap ensures that no friction-weld connection forms on the other face surfaces that lie opposite one another. As a precaution, the length of the steps or stair steps of a step is designed in such a manner that a narrow axial ring gap is present between the face surface of the one component and the radial ring surface of the other component that lies opposite in the same radial position, brought about by the step or the stair step of the step, even after completion of the friction-welding process. However, it is also possible that these face surfaces just touch at the end of the friction-welding process.

According to an advantageous embodiment, the number of steps or stair steps is the same on both components to be connected with one another. This arrangement makes the same inside and outside diameter possible on both components, without disruptive steps. This arrangement is particularly advantageous if the components have a flow applied to them, on the inside and/or outside, if lines or cables pass through the interior of the components, for example, for the passage of which a step or a stair step represents a barrier, or if the components must be provided with a coating on their outer mantle.

According to a particularly advantageous embodiment, the joint-site structure of each component consists of at least two steps or at least two stair steps, wherein the undercut is introduced into the first step or the first stair step, viewed from the outer face side of the component, in each instance. In this way, a radial support ridge is formed on both sides of the joint site, in other words also two steps or stair steps per component, in each instance. One absorbs process forces that act radially inward, and the other absorbs process forces that act radially outward. In this way, more precise coaxiality of the two components is achieved during the welding process.

According to an additional advantageous embodiment, the joining surfaces are configured in the manner of a truncated cone, for example provided with a chamfer. In this way, an improved centering effect of the insertion regions of the components is already achieved immediately before friction welding.

According to another advantageous embodiment, the one flank of the undercut runs as a radial extension of the ring-shaped joining surface. In this way, friction-welding material can spread out directly into the undercut.

According to yet another advantageous embodiment, the other flank of the undercut, which lies opposite the joining surface, runs at an angle of less than 90° relative to the longitudinal axis of the components. In this way, the volume of the undercut for accommodating the friction-welding material increases, without the support effect of the support ridge that remains on the step, for reciprocal support of the mantle surfaces of the components in the coaxial insertion region being impaired.

According to an additional advantageous embodiment, a minimal overlap of 20% is established for sufficient bonding of the two components and for transfer of force. For this purpose, a ratio between the wall thickness in the coaxial insertion region and the at least one step is established. This ratio states that the at least one step amounts to at least 0.6 times the wall thickness of the component in the coaxial insertion region.

According to an advantageous embodiment, the wall thickness of the heat throttle is established for an optimum between the component strength and the restriction of heat conduction from the joint site. For this purpose, the wall thickness of the heat throttle amounts to 0.1 to 0.3 times the wall thickness of the at least one step.

According to another advantageous embodiment, the wall thickness of the support ridge is precisely defined. So that the components can easily be introduced into one another, a coaxial gap must be present in the insertion region, between the two components to be welded together. For this reason, the wall thickness of the support ridge is less than or equal to the difference of the wall thickness of the component in its coaxial insertion region and 1.1 times the wall thickness of the at least one step of the component.

The method according to the invention for connecting components by means of friction welding has the significant advantage, as compared with the state of the art as cited above, that it is guaranteed during the entire friction-welding process that the friction-weld connection takes place only at the intended ring-shaped joining surfaces, in other words only at the specific step or steps where a heat throttle and a support ridge were previously formed by means of the radial undercut.

During the friction-welding process, at least one of the components is put into rotation and coaxially rubbed against the non-rotating component. By means of the friction process, at a specific axial force, friction heat is released, which heats the material at the joint site to almost melting temperature, or to the melting temperature of the material having a lower melting point in the case of different materials. The material becomes non-solid and begins to flow, and thereupon a bead is pressed out of the joint site due to the axial force, which bead is essentially accommodated by the radial undercut. The components constantly become shorter as bead formation starts.

After a specific shortened distance has been traveled, which is less than the initially established width of the axial gap, rotation is braked and the components are compressed at the same or a greater axial force. Because of the interrupted heat source, the material cools down and solidifies again. The axial force is maintained until the compression length reduction has been saturated, and the components are connected with one another with material fit.

Further advantages and advantageous embodiments can be derived from the following description, the claims, and the drawings.

BRIEF DESCRIPTION OF THE DRAWINGS

Other objects and features of the invention will become apparent from the following detailed description considered in connection with the accompanying drawings which show a preferred exemplary embodiment of the object according to the invention, using a connection between two pipes, and will be explained in greater detail below. It is to be understood, however, that the drawings are designed as an illustration only and not as a definition of the limits of the invention.

In the drawings,

FIG. 3a shows the starting geometry of a joint-site structure according to the invention, of two pipes to be welded together, of which only one has an inner step, FIG. 3b shows the joint-site structure from FIG. 3a in an enlarged representation, FIG. 4a shows the starting geometry of a joint-site structure according to the invention, of two pipes to be welded together, of which only one has an outer step, FIG. 4b shows the joint-site structure from FIG. 4a in an enlarged representation.

DETAILED DESCRIPTION OF PREFERRED EMBODIMENTS

Figure 1A:
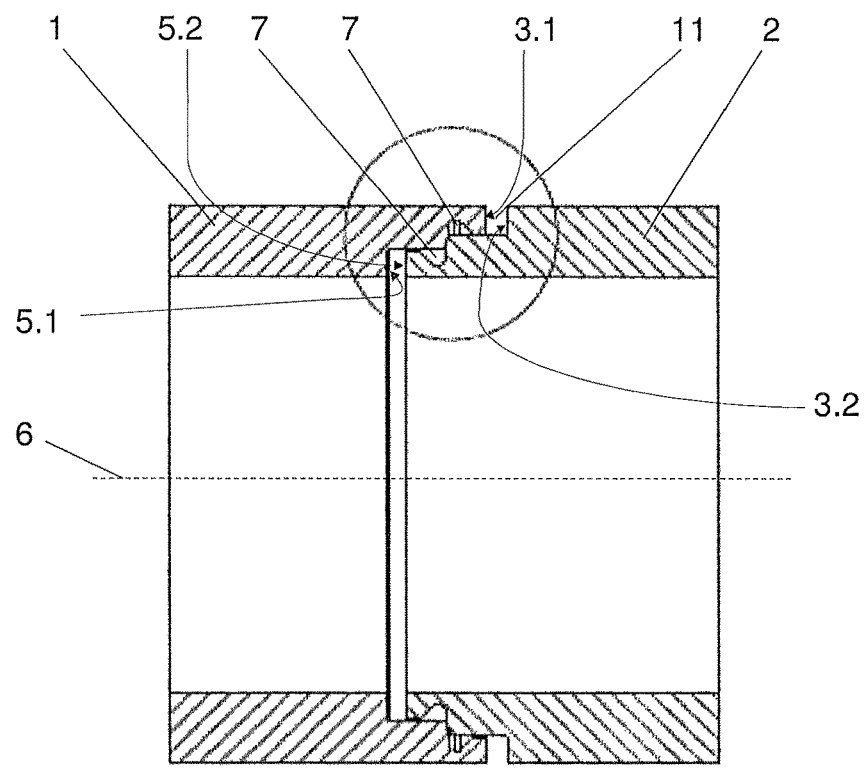
FIG. 1a shows the starting geometry of a joint-site structure according to the invention, of two pipes to be welded together, each having two steps.
Figure 1B:
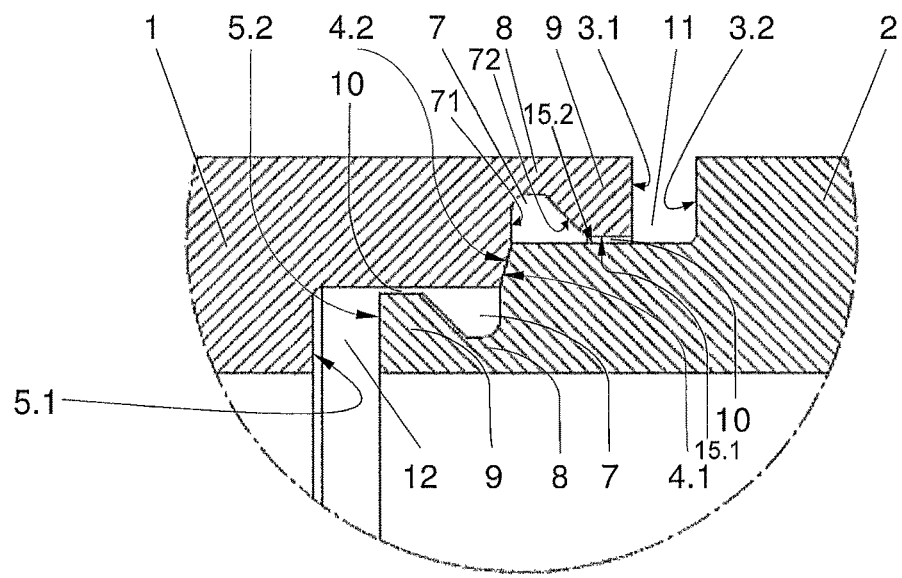
FIG. 1b shows the joint-site structure from FIG. 1a in an enlarged representation.

FIGS. 1a and 1b show the starting geometry of a joint-site structure according to the invention, of two pipes 1 and 2 that have rotation symmetry, are to be connected at their face sides by means of friction welding, and have the same wall thickness and weld seam preparation on both sides. The pipes can also be configured as hollow shafts, for example.

The first pipe 1 has a two-stair-step inner step on its face side that faces the second pipe 2 (this arrangement is equivalent to two inner steps having different diameters), so that on the face side, three ring-shaped face surfaces form, namely an outer face surface 3.1, a center face surface that is set back relative to the former and is referred to as a joining surface 4.1, which will still be explained below, and an inner face surface 5.1 that is once again set back axially relative to the joining surface 4.1. The joining surfaces 4.1 and 4.2 are structured conically in the present example.

The term "inner step" refers to the location of the step in the interior of the pipe 1, while the term "outer, center, and inner face surface" refers to their distance from the center axis 6 of the two pipes 1, 2. The second number after the period, within the reference number, in each instance, identifies the respective pipe 1 or 2, to which the characteristic identified by the first number belongs.

The second pipe 2 has a two-stair-step outer step (which is equivalent to two outer steps having different diameters) on its face side that faces the first pipe 1, which step has a coaxial counter-shape to the two-stair-step inner step of the first pipe 1, so that the two pipes 1, 2 can be easily inserted into one another with their steps before the start of the friction-welding process. The term "outer step" refers to the location of this step on the outer circumference of the pipe 2. On the face side, three ring-shaped face surfaces also form on the second pipe 2, by means of the two-stair-step outer step, namely an outer face surface 3.2, which lies opposite the outer face surface 3.1 of the pipe 1 in the same radial position, a center face surface, which is referred to as a joining surface 4.2 and will be explained below, and lies opposite the joining surface 4.1 of the first pipe 1, and an inner face surface 5.2, which lies opposite the inner face surface 5.1 of the first pipe 1 in the same radial position.

From FIG. 1b, it is evident that an undercut 7 that proceeds from the mantle surfaces of the stair steps, in each instance, is worked into the first stair step of the outer and inner step seen from their face sides, in each instance, in other words into the stair step having the greatest inside diameter, in the case of the first pipe 1, in other words into the step having the smallest wall thickness, and into the stair step having the smallest outside diameter in the case of the second pipe 2, in other words also into the step having the smallest wall thickness, so that a ring-shaped cross-section remains.

In the present example, the undercut 7 has a first flank 71 structured as a radial outward extension of the conical joining surface 4.1 of the pipe 1. The undercut 7 of the pipe 2 also has a flank structured as a radial inward extension of the conical joining surface 4.2. The opposite flank 72 of the undercut 7 is configured conically in the case of the first pipe 1. The opposite flank of the undercut 7 of the second pipe 2 is also configured conically.

At the deepest location of the undercut 7, in each instance, where the remaining ring-shaped cross-section of the steps of the pipes 1, 2 is smallest, a heat throttle 8 forms, in each instance, while the region of the steps that increases in cross-section again, in each instance, toward the outer face surface 3.1 of the first pipe 1 and toward the inner face surface 5.2 of the second pipe 2, or the region of the steps that is not affected by the undercut 7 forms a support ridge 9. An uninterrupted mantle surface of a step or of a stair step of the other pipe 1, 2, in each instance, lies radially opposite every support ridge 9, in each instance.

From FIG. 1b, it is furthermore evident that a radial gap 10 is present between the mantle surface 15.1 of the support ridge 9 of the first pipe 1 and the radially opposite uninterrupted mantle surface 15.2 of the outer step of the second pipe 2, as well as between the support ridge 9 of the second pipe 2 and the radially opposite mantle surfaces of the inner step of the first pipe 1, in each instance. The radial gaps 10 have an axial connection with the respective undercut 7.

An additional characteristic that is essential to the invention is also evident from FIG. 1a and FIG. 1b, which show the position of the two pipes 1, 2 to be connected with one another, at the beginning of the friction-welding process: the two pipes 1, 2 touch only in the region of their center face surfaces, which simultaneously also form the joining surfaces 4.1 and 4.2 of the two pipes 1, 2. This result is achieved in that the axial length of the stair steps of the two-stair-step steps is also predetermined.

It can be seen that radially opposite steps of the two pipes 1, 2 are configured to have different lengths axially, so that a wide outer axial ring gap and a wide inner axial ring gap 11, 12 form between the respective opposite face surfaces of these steps when the joining surfaces 4.1 and 4.2 of the two pipes 1, 2 touch.

The outer axial ring gap 11 extends between the outer face surface 3.1 of the first pipe 1 and the outer face surface 3.2 of the second pipe 2. The inner axial ring gap 12 extends between the inner face surface 5.1 of the first pipe 1 and the inner face surface 5.2 of the second pipe 2.

The axial length of the steps or stair steps is determined by the parameters of the friction-welding technology that is provided for connecting the two pipes 1, 2. In this regard, it is decisive that the starting length of the axial ring gaps 11, 12 must be selected in such a manner that the width of the axial ring gaps 11, 12, which becomes shorter during the friction-welding process due to plastification of the center face surfaces of the pipes 1, 2, which touch one another, does not become less than or equal to zero by the end of the friction-welding process, i.e. that the outer face surfaces 3.1 and 3.2 as well as the inner face surfaces 5.1 and 5.2, which lie opposite one another in the radial position, do not touch or at most just touch even after the friction-welding process is concluded. In this way, it is guaranteed that solely the center face surfaces of the steps or stair steps, which surfaces have a direct connection to the respective undercut 7, function as joining surfaces 4.1 and 4.2, i.e. make contact from the beginning to the end of the friction-welding process and soften under the effect of the friction-welding process.

Figure 1C:
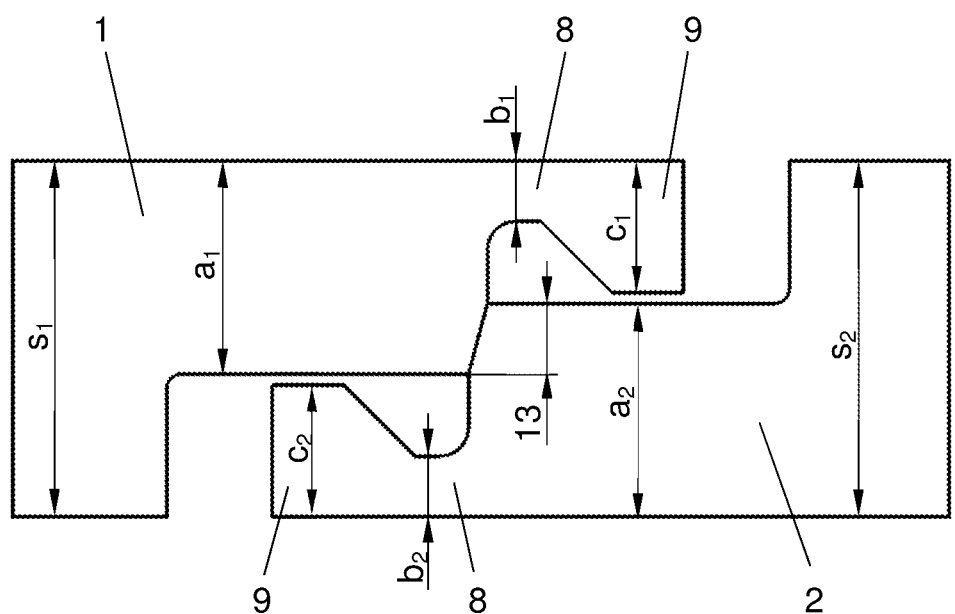
FIG. 1c shows the joint-site structure from FIG. 1a and FIG. 1b with identification of the wall thicknesses.

FIG. 1c shows the joint-site structure in the wall region of the friction-weld connection shown in FIG. 1a and FIG. 1b, with the variables essential to the joint-site structure according to the invention. The wall thickness of the pipes 1 and 2 was indicated as $s_1$ and $s_2$. Proceeding from the wall thickness $s_1$, $s_2$ of the pipes 1 and 2, a first step having the wall thickness $a_1$ and $a_2$ follows, which forms the inner horizontal insertion region of the joining structure. A second step having a wall thickness $c_1$ or $c_2$ follows the first step in the axial direction. The radial expanse of the joining surfaces 4.1, 4.2, which can run conically or also at a right angle to the pipe axis, results from the ratio of $a_{1,2}$ to $s_{1,2}$. The radial difference of the steps having the wall thicknesses $a_1$ and $a_2$ represents the overlap 13 of the joining surfaces. The wall thickness of these steps is reduced to a minimal wall thickness, namely the wall thickness $b_1$ or $b_2$ of the heat throttle 8, by means of the radial undercut 7 worked in at the transition from the first to the second step. The region of the second step, which follows the heat throttle 8 axially, represents the support ridge 9, so that the wall thickness $c_1$ or $c_2$ of the latter corresponds to the thickness of this step.

For a sufficient cross-section of the weld seam and for force transfer, the overlap 13, in other words the radial overlap of the face-side joining surfaces 4.1 and 4.2, must have a minimal size. For an overlap 13 of at least 20% of the wall thickness $s_{1,2}$ of the pipes 1 and 2, as well as for optimal action of the heat throttle 8 and easy insertion of the pipes 1 and 2 into one another, the following dependencies occur for the joint-site structure shown in FIG. 1a, FIG. 1b and FIG. 1c:

$$0.6s \leq a \leq 0.8s$$

$$0.1a \leq b \leq 0.3a$$

$$b \leq c \leq s-a.$$

The dependencies indicated hold true for both pipes 1 and 2, so that at the stated size ratios, no differentiation using the indices takes place at the wall thicknesses a, b, c and s.

Using the joint-site structure according to the invention as described above, as well as FIG. 2a and FIG. 2b, the method of effect of the invention will be explained in greater detail below, in connection with the description of the method for connecting the two pipes 1, 2 by means of friction welding.

To join the two pipes 1, 2, these are inserted into one another with their ends provided with the two-stair-step steps, along their common axis of rotation 6, until their center face surfaces, in other words their joining surfaces 4.1 and 4.2, bump up against one another, wherein the radial gap 10 forms between the support ridges 9 and the uninterrupted mantle surfaces of the step stair-steps that lie radially opposite them.

The aforementioned axial ring gaps 11 and 12 are present between the outer and inner face surfaces 3.1 and 3.2 as well as 5.1 and 5.2, which lie opposite one another at an axial distance. The friction-welding process begins in that at least one of the pipes 1, 2 is put into rotation and driven coaxially onto the other, possibly non-rotating pipe under the effect of axial process forces. Friction heat is released by the friction process under an increased axial force, which heat heats up the material in the region of the joint site, in other words at the joining surfaces 4.1 and 4.2, to almost the melting temperature of the material that has the lower melting temperature. The material desolidifies and begins to flow, whereupon a bead 14 is pressed out of the joint site due to the axial force, and, as is evident from FIG. 2b, is accommodated by the cavity of the undercut 7, which lies adjacent to the respective joining surface 4.1, 4.2, and essentially functions as a bead chamber here. Process gases as well as contaminants and chips can escape or be pressed outward by way of the radial gaps 10 and furthermore by way of the outer ring gap 11, and into the interior of the pipes 1, 2 by way of the inner ring gap 12.

The pipes 1, 2 become constantly shorter once bead formation starts. Due to the shortening of the pipes 1, 2, the support ridges 9 move along their radially opposite mantle surfaces of the step stair-steps, and thereby the outer and inner face surfaces 3.1 and 3.2 as well as 5.1 and 5.2 move toward one another.

After a certain reduction in length has been achieved, which is less than the starting width of the axial ring gaps 11, 12, rotation is braked to a stop and the pipes 1, 2 are compressed at the same or a greater axial process force. To state it differently, the welding process is continued until the outer and inner axial ring gap 11, 12 is almost closed.

The bead chambers, which are predetermined by the undercuts 7 in the pipes 1, 2, partially fill with the friction-weld bead 13 from the joint site during this process. Due to termination of the rotation movement, the joint site no longer receives any energy in the form of friction heat, and the material cools down and solidifies again. The axial process force is maintained until the compression shortening is saturated and the pipes 1, 2 are connected with one another with material fit. In this regard, as is evident from FIG. 2b, the width of the axial ring gaps 11, 12 is reduced to a minimum. It is also possible, however, that the outer and inner face surfaces 3.1 and 3.2 as well as 5.1 and 5.2 just touch one another. FIG. 2b shows that the radial gaps 10 are also still maintained even after completion of the friction-weld connection.

Figure 2A:
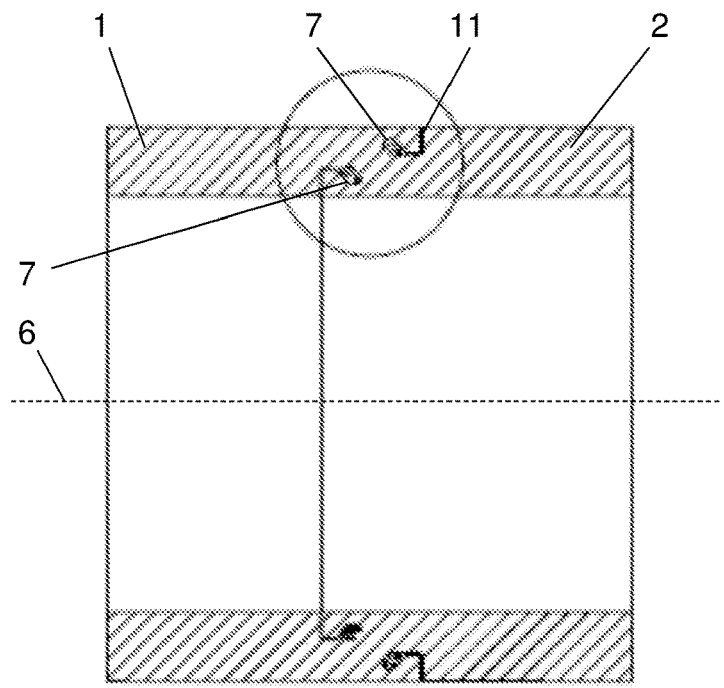
FIG. 2a shows the two welded pipes after completion of the friction-welding process.
Figure 2B:
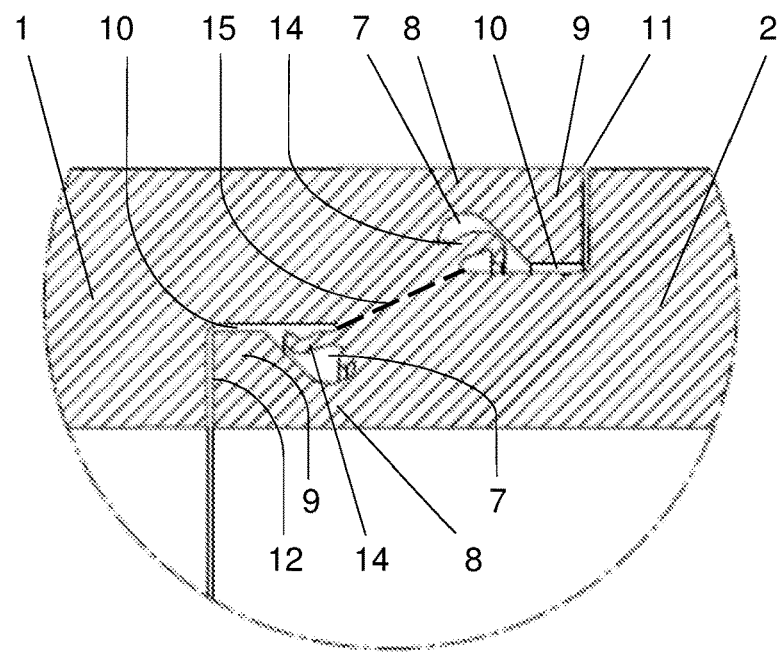
FIG. 2b shows the joint site from FIG. 2a in an enlarged representation.

As is furthermore evident from FIG. 2a and FIG. 2b, a conical joining surface 15, indicated in FIG. 2b by a broken line, which surface is larger than the original contact surface of the conical joining surfaces 4.1 and 4.2 of the pipes 1 and 2, has formed after completion of the friction-welding process. The heat throttles 8 formed by the undercuts 7 in the outer and inner steps ensure that the support ridges 9 remain in the cold, solid state during the friction phase, and thereby are able to balance out or absorb the radial and tangential tensions caused by the friction-welding process. This feature is expressed by the inside and outside diameters of the two pipes 1, 2 being maintained.

In FIG. 3a to FIG. 6b, four different embodiments of the joint-site structure according to the invention for friction welding pipes using one-sided weld seam preparation are shown, which maximally have one step. The figures show the joint-site structure before the beginning of the friction-welding process, in each instance.

The items in these figures, which agree with the items shown in FIG. 1a to FIG. 2b, were given the same reference numbers as in FIG. 1a to FIG. 2b. Thus, FIG. 3a to FIG. 4b show two pipes 1, 2, to be connected by means of friction welding, only one of the two of which has a step, namely an inner step in FIG. 3a and FIG. 3b and an outer step in FIG. 4a and FIG. 4b, wherein in these figures, the pipe that has the step was given the reference number 1, and the pipe without such a seam preparation was given the reference number 2.

In each case, however, the undercut 7 that forms the heat throttle 8 and the support ridge 9 is provided in the mantle surface of this one step. The joining surfaces 4.1 (FIG. 3) and 4.2 (FIG. 4) are formed by the set-back inner face surface of the first pipe 1 (FIG. 3) and the set-back outer face surface of the second pipe 2 (FIG. 4).

In both embodiments, no axial gap is present, because there is no other face surface that lies opposite the outer face surface 3.1 of the first pipe 1 and the inner face surface 5.2 of the second pipe that form the joining surface 4.1 and 4.2, in each instance.

In the joint-site structures shown here, however, no radial flushness of the pipes 1, 2 is achieved in the outer mantle surface (FIG. 3) or the inner mantle surface (FIG. 4). For a sufficient cross-section of the weld seam for force transfer, the overlap 13, in other words the radial overlap of the face-side friction surfaces 4.1 and 4.2, must have a minimal size. For an overlap 13 of at least 20% of the wall thickness $s_1$ of the pipes 1 and 2, as well as for optimal action of the heat throttle and easy introduction of the pipes 1 and 2 into one another, the following dependencies occur for the joint-site structure shown in FIG. 3a to FIG. 4b:

$$0.1s_1 \leq b \leq 0.3s_1$$

$b \leq c \leq 0.8 s_1$ $s_2 \geq s_1 - c$

The indices 1 and 2 were assigned to the respective pipe 1 or 2.

Figure 5A:
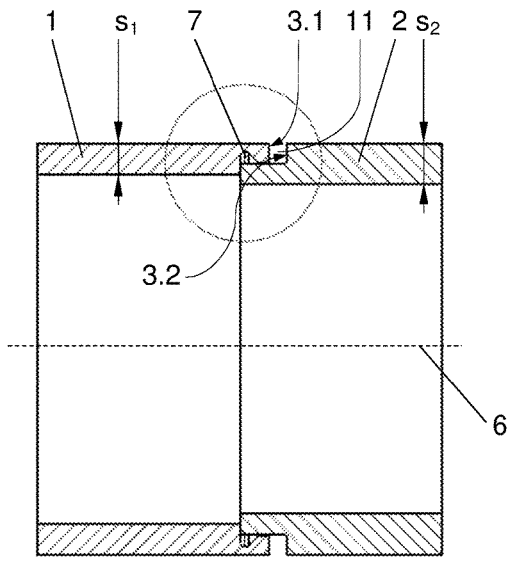
FIG. 5a shows the starting geometry of a joint-site structure according to the invention, of two pipes to be welded together, which both have only one step and are flush at their outer circumference.
Figure 5B:
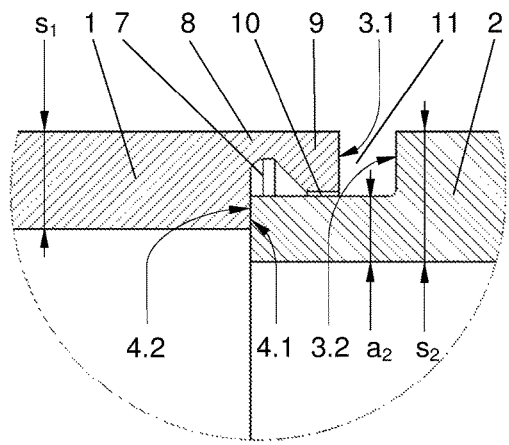
FIG. 5b shows the joint-site structure from FIG. 5a in an enlarged representation.
Figure 6A:
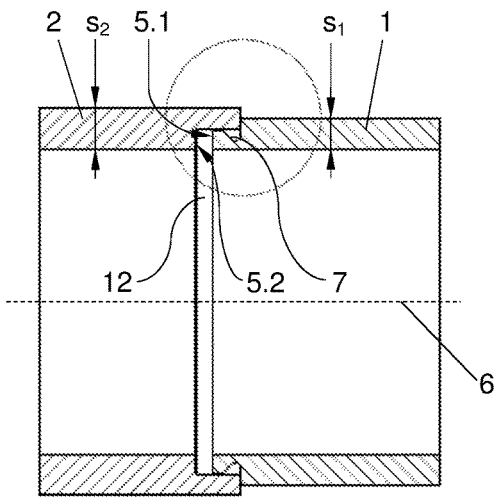
FIG. 6a shows the starting geometry of a joint-site structure according to the invention, of two pipes to be welded together, which both have only one step and are flush at their inner circumference.
Figure 6B:
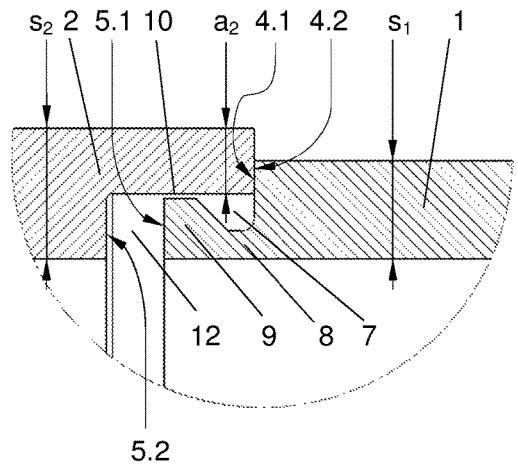
FIG. 6b shows the joint-site structure from FIG. 6a in an enlarged representation.

Radial flushness of the pipes 1, 2 is always achieved if at least one of the diameters of the pipes 1, 2 is the same size, the number of steps in the region of the joint sites of the two pipes 1, 2 is the same, and the diameters of the steps also have the same dimensions. Thus, FIG. 5a and FIG. 5b show two pipes 1, 2 to be connected by means of friction welding, the outside diameters of which are the same, so that they are flush at the outer circumference, and FIG. 6a and FIG. 6b show pipes, the inside diameters of which are the same, so that a flush inner circumference occurs. Although the first pipe 1 has an inner step, the second pipe has a congruent outer step. The undercut 7 is introduced into the step of the pipe 1, 2 that has the thinner wall, in each instance, in other words into the inner step of the pipe 1 in the case of the outer flush embodiment of FIG. 5, and into the outer step of the pipe 2 in the case of the inner flush embodiment according to FIG. 6.

When the number of steps in the joining region of the pipes 1, 2 is the same, however, at least two outer face surfaces 3.1 and 3.2 (FIG. 5) or two inner face surfaces 5.1 and 5.2 (FIG. 6) always still lie opposite one another, between which surfaces, as described above, a sufficiently wide outer axial ring gap 11 or a sufficiently wide inner axial ring gap 12 must be present at the beginning of the friction-welding process, for the reasons stated, in addition to the joining surfaces 4.1 and 4.2, which form the joint site of the friction-weld connection. Likewise, here the overlap 13, in other words the radial overlap of the face-side friction surfaces 4.1 and 4.2, must have a minimal size for a sufficient cross-section of the weld seam and for force transfer. For an overlap 13 having at least 20% of the wall thickness $s_1$ of the pipes 1 and 2, as well as for optimal action of the heat throttle and easy introduction of the pipes 1 and 2 into one another, the following dependencies occur for the joint-site structure shown in FIG. 5a to FIG. 6b:

$0.1 s_1 \leq b \leq 0.3 s_1$ $b \leq c \leq 0.8 s_1$ $a_2 \geq s_1 - c$

The indices 1 and 2 were assigned to the respective pipe 1 and 2.

All of the characteristics presented here can be essential to the invention both individually and in any desired combination with one another.

Although only a few embodiments of the present invention have been shown and described, it is to be understood that many changes and modifications may be made thereunto without departing from the spirit and scope of the invention.

What is claimed is:

1. A joint-site structure comprising:
   first and second components having first and second ends, respectively, to be connected using a friction welding process;
   wherein the first end has a first coaxial insertion region and the second end has a second coaxial insertion region;
   wherein the first component has an outside diameter;
   wherein the first coaxial insertion region has at least one step having a step diameter;
   wherein the step diameter is smaller than the outside diameter of the first component;
   wherein the at least one step forms a ring-shaped joining surface set back axially relative to a first face surface of the first component;
   wherein the second component has a joining surface abutting against the ring-shaped joining surface of the first component;
   wherein the first coaxial insertion region has a first mantle surface and the second coaxial insertion region has a second mantle surface;
   wherein the first and second mantle surfaces engage into one another and a radial gap is situated between the first and second mantle surfaces;
   wherein the at least one step is provided with a radial undercut so that a heat throttle having a heat throttle diameter is formed, the heat throttle diameter being larger than the step diameter and smaller than the outside diameter;
   wherein on a face side the first coaxial insertion region comprises a radial support ridge connected to the heat throttle, the radial support ridge having a diameter smaller than the heat throttle diameter;
   wherein the radial support ridge comprises the first mantle surface and ends radially inwardly at the first mantle surface; and
   wherein the at least one step has a length designed so that when the ring-shaped joining surface of the first component makes contact with the joining surface of the second component, other face surfaces of the first and second components lying opposite one another in an identical radial position remain exposed until completion of the friction-welding process.

2. The joint-site structure according to claim 1, wherein the first and second components have an identical number of steps.

3. The joint-site structure according to claim 1, wherein each of the first and second components has at least first and second steps, and a respective radial undercut introduced into each of the first steps viewed from the first face surface of the first component and a second face surface of the second component, respectively.

4. The joint-site structure according to claim 1, wherein the ring-shaped joining surfaces are configured as a truncated cone.

5. The joint-site structure according to claim 1, wherein the undercut has a first flank comprising a radial extension of the ring-shaped joining surface of the first component.

6. The joint-site structure according to claim 5, wherein the undercut has a second flank lying opposite the ring-shaped joining surface of the first component and extending at an angle of less than 90° relative to a longitudinal axis of the first and second components.

7. The joint-site structure according to claim 1, wherein the at least one step has a first wall thickness at a radial inward end of the ring-shaped joining surface;
   wherein the first component has a full thickness in a region outside of the first coaxial insertion region; and
   wherein the first wall thickness amounts to at least 0.6 times the full thickness of the first component.

8. The joint-site structure according to claim 7, wherein the heat throttle of the first component has a second wall thickness amounting to 0.1 to 0.3 times the first wall thickness of the at least one step of the first component.

9. The joint-site structure according to claim 1, wherein the support ridge of the first component has a ridge wall thickness;

wherein the at least one step has a first wall thickness at a radial inward end of the ring-shaped joining surface;

wherein the first component has a full thickness in a region outside of the first coaxial insertion region; and wherein the ridge wall thickness is less than or equal to a difference of (A) the full thickness and (B) 1.1 times the first wall thickness of the at least one step of the first component.

10. A method for connecting first and second components using overlap friction welding comprising:

providing first and second components having first and second ends, respectively, wherein the first end has a first coaxial insertion region and the second end has a second coaxial insertion region, wherein the first component has an outside diameter, wherein the first coaxial insertion region has at least one step having a step diameter, wherein the step diameter is smaller than the outside diameter of the first component, and wherein the at least one step forms a ring-shaped joining surface set back axially relative to a first face surface of the first component;

first, inserting the first and second coaxial insertion regions of the first and second components, respectively, axially into one another until the ring-shaped joining surface of the first component abuts against a joining surface of the second surface, wherein a first mantle surface of the first coaxial insertion region of the first component engages into a second mantle surface of the second coaxial insertion region of the second component, wherein a radial gap forms between the first mantle surface and the second mantle surface; and subsequently putting at least one of the first and second components into rotation and pressing the first and second components against one another by an axially acting process force until material of at least one of the first and second components softens;

wherein the at least one step is provided with a radial undercut so that a heat throttle having a heat throttle diameter is formed, the heat throttle diameter being larger than the step diameter and smaller than the outside diameter;

wherein on a face side the first coaxial insertion region comprises a radial support ridge connected to the heat throttle, the radial support ridge having a diameter smaller than the heat throttle diameter;

wherein the radial support ridge comprises the first mantle surface and ends radially inwardly at the first mantle surface;

wherein the at least one step has a length designed so that at a beginning of a friction welding process, an axial ring gap is present between the first face surface of the first component and a second face surface of the second component lying opposite in an identical radial position; and wherein a width of the axial ring gap is reduced during action of the axially acting process force on the first and second components at an end of the friction-welding process.

11. The method according to claim 10, wherein hollow shafts are used as first and second components that are connected with one another using overlap friction welding.

* * * * *